United States Patent [19]

Ahrens et al.

[11] 4,029,365

[45] June 14, 1977

[54] METHOD FOR FEEDING POWDERED MATERIAL

[75] Inventors: Norbert Ahrens, Oelde; Heinrich Klockenbusch, Ahlen; Horst Ritzmann, Enniger; Hans Klein, Beckum; Gerhard Balzau, Neubeckum; Clemens Schnuckel, Stromberg, all of Germany

[73] Assignee: Polysius AG, Neubeckum, Germany

[22] Filed: Dec. 22, 1975

[21] Appl. No.: 643,097

[30] Foreign Application Priority Data

Dec. 27, 1974 Germany .......................... 2461579

[52] U.S. Cl. ................................. 302/35; 302/42; 302/53; 222/56

[51] Int. Cl.² ......................................... B65G 53/66

[58] Field of Search .............. 302/3, 35, 42, 53, 57, 302/66; 222/56, 57, 61

[56] References Cited

UNITED STATES PATENTS

| | | | |
|---|---|---|---|
| 2,827,333 | 3/1958 | Wallin | 302/42 |
| 3,964,793 | 6/1976 | Volpeliere | 302/42 |

Primary Examiner—Johnny D. Cherry
Assistant Examiner—Jeffrey V. Nase
Attorney, Agent, or Firm—Learman & McCulloch

[57] ABSTRACT

This invention relates to a method and a device for the continuous feed of a controllable amount of powder material from a storage container to a consumer, using a vertical pneumatic conveyor, to which is fed conveying air, with loosening air supplied to the base area.

1 Claim, 5 Drawing Figures

METHOD FOR FEEDING POWDERED MATERIAL

In process techniques for feeding raw powdered cement, for example, from a storage silo to the preheater of a kiln unit, the problem frequently arises of feeding powder material in specific and controllable amount from a storage container to a consumer. For this purpose the material extracted from the storage container is usually fed to a balance and then to a vertical pneumatic conveyor which passes the material on to the consumer. The measuring signal supplied by the balance is used to control the amount extracted from the storage container. The balance must in this case be calibrated at specific intervals; a separate calibrated container for the material is usually needed for this purpose.

This known method involves various disadvantages. Because of the necessary balance, calibrated container, and additional conveyor means, there is a relatively high expenditure on technical equipment. Also very disadvantageous is the large height of the structure caused by the several pieces of equipment.

The invention thus has for an objective the avoidance of these disadvantages while providing a method (and also apparatus suitable for carrying out the method) which permits the feed of a controllable amount of powder material from a storage container to a consumer, using particularly simple items of plant and reducing the height of the apparatus.

According to the invention this objective is attained in that the desired amount to be extracted from the storage container is controlled in dependence on the base pressure of loosening air in the vertical conveyor, with the relationship between this base pressure of loosening air and the output of the vertical conveyor being determined by calibration.

With the method provided by the invention the vertical pneumatic conveyor, which is in any case present in the plant, is used to measure the amount of material being withdrawn from the storage container and to adjust the amount extracted to the desired value. Tests of the invention have in fact shown that there is a definite relation between the base pressure of the loosening air for the vertical pneumatic conveyor and the output of such conveyor, i.e., the amount of material extracted from the storage container per unit of time, and that this relation can be simply determined by calibration and then used for controlling the extraction rate.

In the method according to the invention therefore not only do the expensive balance hitherto needed between the storage container and the vertical pneumatic conveyor, the additional calibration container also needed previously, and the corresponding transport means all become unnecessary, but in addition the total height of the plant is considerably reduced.

The invention will be described in more detail below, with reference to the accompanying drawings in which.

Figure 1:
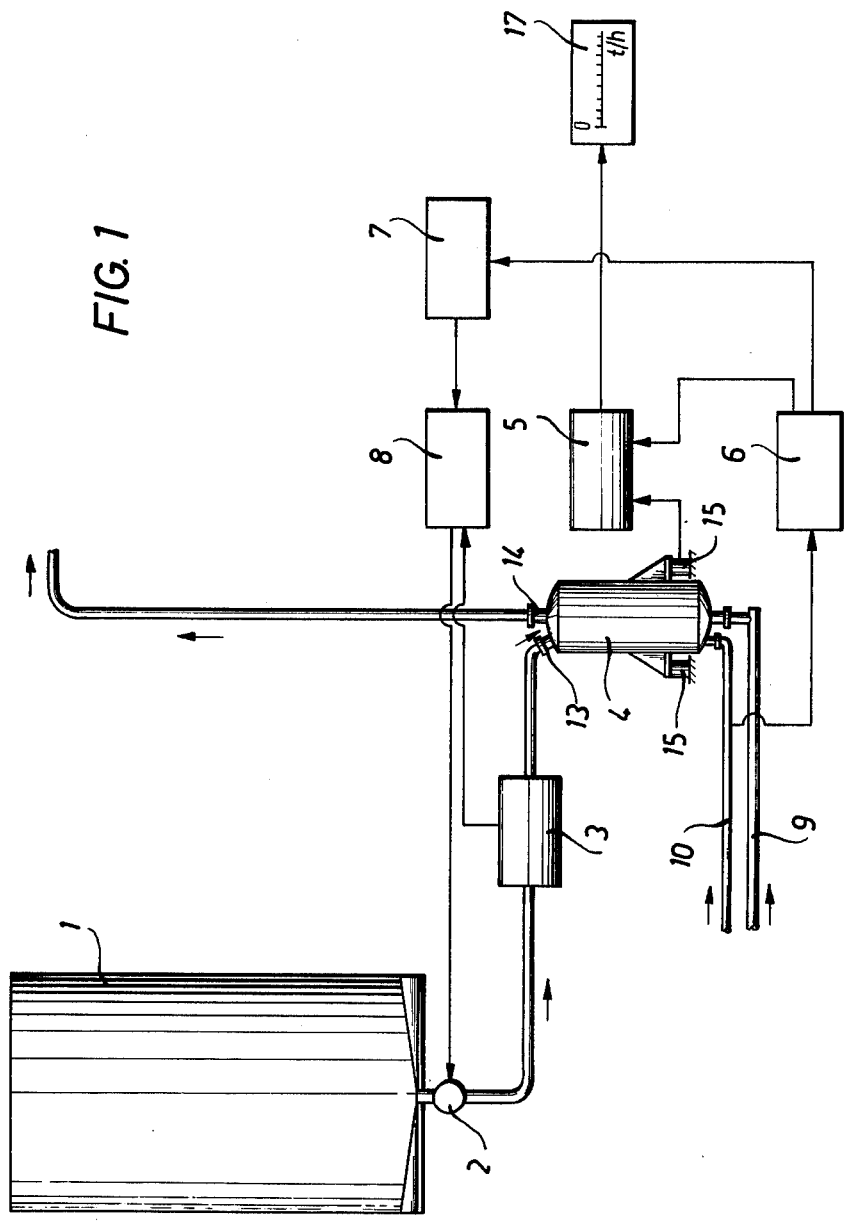
FIG. 1 is a diagram of plant operating with the method of the invention.
Figure 2:
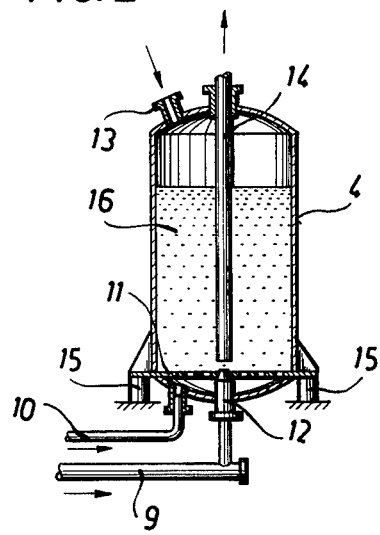
FIG. 2 is a diagrammatic representation of the vertical pneumatic conveyor used in the plant shown in FIG. 1.

The plant shown in FIGS. 1 and 2 includes a storage container 1 for powdered material, a known controllable extractor valve device 2, known flow measuring means 3 for measuring the quantity extracted, a conventional vertical pneumatic conveyor 4, a known function generator 5, known controllers 6, 7 and 8, a conduit 9 for conveying air, and a conduit 10 for fluidizing or loosening air.

The vertical pneumatic conveyor 4 is provided in known manner with a porous base 11 to which loosening air is supplied from the conduit 10. The conveying air, which is fed from the conduit 9, enters through a nozzle 12 which extends through the base to establish a discharge gas stream. The material from the storage container 1 passes through the measuring means 3 and through the pipe 13 into the vertical pneumatic conveyor. The extraction of the material from the conveyor 4 takes place through the conveyor pipe 14. The conveyor 4 is supported at its base on known pressure elements 15, such as electrical transducers, which produce an electrical output signal G corresponding to the weight of the conveyor and the material 16 therein.

The pressure in the loosening air conduit 10 varies inversely as the contents of the conveyor 4 vary and such pressure variations may be detected by sensor in the conduit 10 which generates and delivers a signal to the controller 6 which in turn delivers a signal to the controller 7 and thence to the controller 8 which effects opening and closing movements of the extractor device 2. Signals generated by the controller 6 also are delivered to the function generator 5. The generator is connected to and operates an indicator 17 calibrated in tons per hour. The controller 8 also receives signals from the flow measuring means 3.

In order to calibrate the plant, the vertical pneumatic conveyor 4 is filled with a selected powder material, such as raw powdered cement, and the extractor device 2 of the storage container 1 is closed. Conveying air via the conduit 9 and base loosening air via the conduit 10 are continuously supplied to empty the conveyor 4.

Figure 3:
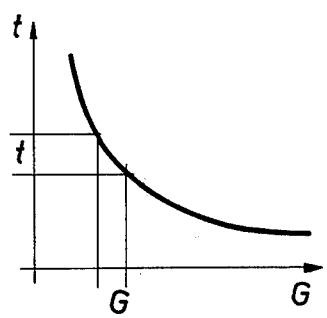
FIGS. 3 – 5 are diagrams for explaining the method providing by the invention.
Figure 4:
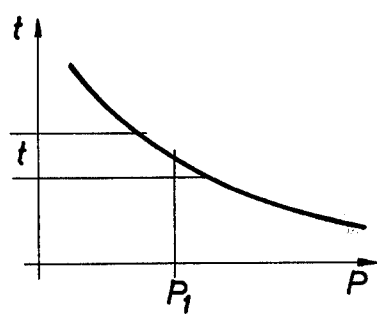

The weight signal G emitted by the pressure elements 15 and the varying pressure P of the base loosening air (conduit 10) are thereby determined in relation to the time $t$. The relationships shown in FIGS. 3 and 4 are thus given.

Figure 5:
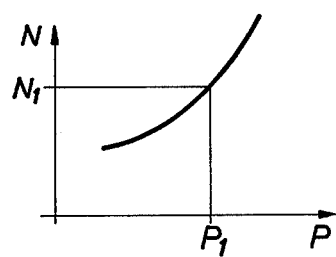

If for example the weight decreased by the amount $\Delta G$ in the period $\Delta t$, and if the pressure of the loosening air has a mean value of $P_1$ over this period of time, the corresponding output $N_1$ of the vertical pneumatic conveyor, i.e., the amount of material extracted per unit time, can be calculated for this value $P_1$. In this manner calibration will produce the relationship shown in FIG. 5 between the output N of the vertical pneumatic conveyor and the base pressure P of the loosening air.

This functional relationship, which will obviously vary with the material, may be used to set the function generator 5 so that the indicator 17 reflects a predetermined extraction rate or output N in tons per hour in relation to the base pressure P of the loosening air.

During operation of the plant the aimed-at value of the output N, and hence the quantity extracted by the controllable extractor device 2 is set by the generator 5. The controllers 6, 7 and 8 adjust the device 2 in dependence on the base pressure P of the loosening air. For example, if the pressure P increases, an excess of material for the output N occupies the conveyor 4. The device 2, therefore should be adjusted to reduce the delivery of material to the conveyor 4. If the pressure P decreases, the device 2 should be adjusted to deliver a greater quantity of material to the conveyor. This ensures that the desired amount of material per unit of time is extracted from the storage container 1. The loosening air giving rise to the base pressure P and the material needed by the vertical pneumatic conveyor are thus constantly adjusted.

It has been found desirable for the diameter: height ratio for the vertical pneumatic conveyor to be as high as possible, preferably between 1:2 and 1:3.

What we claim is:

1. A method of controlling continuously the output of powder material from a vertical, pneumatic conveyor having a material inlet, a material outlet, and a porous base, said method comprising introducing material from a container therefor to said conveyor via said inlet at a predetermined initial rate; establishing a discharge gas stream between said base and said outlet for discharging material from said conveyor; introducing a fluidizing gas under pressure independently of paid discharge gas to said base for loosening material thereon; continuously measuring the pressure of said fluidizing gas; and increasing and decreasing the rate of introduction of material to said conveyor according to decreases and increases, respectively, in the pressure of said fluidizing gas.

* * * * *